US012489786B2

(12) United States Patent
Yang

(10) Patent No.: US 12,489,786 B2
(45) Date of Patent: Dec. 2, 2025

(54) METHOD AND APPARATUS FOR DETERMINING COMPROMISED HOST

(71) Applicant: Huawei Technologies Co., Ltd., Shenzhen (CN)

(72) Inventor: Duo Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 18/620,086

(22) Filed: Mar. 28, 2024

(65) Prior Publication Data

US 2024/0244080 A1 Jul. 18, 2024

Related U.S. Application Data

(63) Continuation of application No. PCT/CN2022/101662, filed on Jun. 27, 2022.

(30) Foreign Application Priority Data

Sep. 30, 2021 (CN) .......................... 202111161856.3

(51) Int. Cl.
 *H04L 9/40* (2022.01)
(52) U.S. Cl.
 CPC ...... *H04L 63/1483* (2013.01); *H04L 63/1416* (2013.01)
(58) Field of Classification Search
 CPC ............. H04L 63/1416; H04L 63/1491; H04L 61/4511
 See application file for complete search history.

(56) References Cited

U.S. PATENT DOCUMENTS

| 9,325,735 | B1 * | 4/2016 | Xie ..................... H04L 63/1425 |
| 2005/0235044 | A1 * | 10/2005 | Tazuma .............. G06F 16/9574 |
| | | | 709/217 |
| 2008/0028463 | A1 * | 1/2008 | Dagon ................ H04L 63/1425 |
| | | | 726/22 |

(Continued)

FOREIGN PATENT DOCUMENTS

| CN | 110572406 A | 12/2019 |
| CN | 111786964 A | 10/2020 |

(Continued)

OTHER PUBLICATIONS

Guy Bruneau, "DNS Sinkhole", SANS Institute InfoSec Reading Room, Aug. 7, 2010 (Aug. 7, 2010), XP055168392, total 42 pages.

(Continued)

*Primary Examiner* — Hieu T Hoang
(74) *Attorney, Agent, or Firm* — Slater Matsil, LLP

(57) ABSTRACT

In accordance with an embodiment, a method includes: receiving, from a host, a DNS domain name request forwarded by the internal DNS server; in response to a domain name carried in the DNS domain name request being a malicious domain name, determining a fake internet protocol (IP) address that is in a one-to-one correspondence with the malicious domain name; returning the fake IP address to the host via the internal DNS server; receiving a communication link establishment request packet from the host; and in response to a destination IP address in the communication link establishment request packet being the fake IP address, determining that the host is a compromised host.

18 Claims, 9 Drawing Sheets

(56) References Cited

U.S. PATENT DOCUMENTS

| | | | | |
|---|---|---|---|---|
| 2009/0288157 | A1* | 11/2009 | Pacella | H04L 63/1441 |
| | | | | 726/12 |
| 2016/0080395 | A1 | 3/2016 | Reddy et al. | |
| 2017/0006061 | A1* | 1/2017 | Murphy | H04L 63/1441 |
| 2017/0163603 | A1* | 6/2017 | Xu | H04L 63/1441 |
| 2017/0195295 | A1* | 7/2017 | Tatlicioglu | H04L 63/0414 |
| 2017/0339186 | A1* | 11/2017 | Gurvich | H04L 61/5007 |
| 2019/0081952 | A1* | 3/2019 | Wood | H04L 63/1491 |
| 2019/0215331 | A1 | 7/2019 | Anakata et al. | |

FOREIGN PATENT DOCUMENTS

| | | |
|---|---|---|
| CN | 111818073 A | 10/2020 |
| CN | 113179280 A | 7/2021 |

OTHER PUBLICATIONS

Jung Hyun Mi et al., "Efficient Malicious Packet Capture Through Advanced DNS Sinkhole", Wireless Personal Communications, Springer, Dordrecht, NL, vol. 93, No. 1, Jun. 24, 2016 (Jun. 24, 2016), pp. 21-34, XP036163494.

Ussath Martin et al., "Enhanced Sinkhole System: Collecting System Details to Support Investigations", Sep. 27, 2017 (Sep. 27, 2017), SAT 2015 18th International Conference, Austin, TX, USA, Sep. 24-27, 2015; [Lecture Notes in Computer Science; Lect.Notes Computer], Springer, Berlin, Heidelberg, pp. 18-33, XP047449135.

* cited by examiner

METHOD AND APPARATUS FOR DETERMINING COMPROMISED HOST

CROSS-REFERENCE TO RELATED APPLICATIONS

This application is a continuation of International Application No. PCT/CN2022/101662, filed on Jun. 27, 2022, which claims priority to Chinese Patent Application No. 202111161856.3, filed on Sep. 30, 2021. The disclosures of the aforementioned applications are hereby incorporated by reference in their entireties.

TECHNICAL FIELD

This application relates to the field of communication technologies, and in particular, to a method and an apparatus for determining a compromised host.

BACKGROUND

When a host or a terminal is successfully intruded or executes malicious software, the host or the terminal is referred to as a compromised host. After the host or the terminal becomes the compromised host, the compromised host generally communicates with an attacker server, so that the attacker server sends instructions to the compromised host, to further penetrate an internal network of the compromised host, steal user data, or the like. According to current industry statistics, more than 90% of the compromised hosts use a domain name system (DNS) to communicate with the attacker server. In other words, the compromised host sends a DNS domain name request carrying a malicious domain name (that is, a domain name used by the attacker server) to an Internet DNS server, and after receiving an internet protocol (IP) address of the attacker server returned by the Internet DNS server by parsing the malicious domain name carried in the DNS domain name request, the compromised host communicates with the attacker server based on the returned IP address of the attacker server.

To eliminate a threat of the compromised host, the compromised host needs to be found first. A current mainstream solution for searching for the compromised host is mainly to detect, at a boundary device (for example, a firewall device) based on a malicious domain name database, the malicious domain name carried in the DNS domain name request sent by the compromised host, and after detecting the malicious domain name, determine a host that sends the DNS domain name request carrying the malicious domain name as the compromised host.

However, when the DNS domain name request of the compromised host is forwarded to the boundary device via an internal DNS server, after detecting the malicious domain name, the boundary device considers the internal DNS server that forwards the DNS domain name request carrying the malicious domain name as the compromised host. In this way, a true compromised host cannot be determined, and the threat of the compromised host cannot be further eliminated.

SUMMARY

Embodiments of this application provide a method and an apparatus for determining a compromised host. According to the method, the compromised host and attack evidence information can be accurately determined in a scenario in which an internal DNS server exists in a network system.

According to a first aspect, embodiments of this application provides a method for determining a compromised host, where the method is applied to a boundary device in a network system. The boundary device is located at a boundary of an internal network of the network system, and the network system further includes a host and an internal domain name system DNS server located in the internal network. The method includes: receiving, from the host, a DNS domain name request forwarded by the internal DNS server; determining, if a domain name carried in the DNS domain name request is a malicious domain name, a fake internet protocol IP address that is in a one-to-one correspondence with the malicious domain name; returning the fake IP address to the host via the internal DNS server; receiving a communication link establishment request packet from the host; and determining, if a destination IP address in the communication link establishment request packet is the fake IP address, that the host sending the packet is a compromised host.

According to the embodiment method provided in this application, in a scenario in which the internal DNS server exists in the network system, the boundary device (for example, a firewall device) in the network system may quickly determine the compromised host. In addition, the boundary device may further determine the malicious domain name that each compromised host requests to access. In this way, the boundary device determines, based on the malicious domain name requested by the compromised host to access, related information of the domain name from a malicious domain name database, for example, family information of the domain name and information about tactics, techniques, and procedures (TTPs) of the domain name family. In this way, based on the information, a user may quickly analyze and formulate an effective threat handling solution to process the compromised host, so as to eliminate a threat of the compromised host.

In a possible design, the foregoing fake IP address is any unoccupied IP address in a fake IP address pool.

In another possible design, before the determining a fake IP address that is in a one-to-one correspondence with the malicious domain name, the method further includes: receiving a network segment address of the fake IP address pool that is input by a user; or generating the fake IP address pool based on an idle IP address in the internal network of the network system.

According to the two possible designs, the boundary device may be preconfigured to obtain the fake IP address pool, and the IP address in the fake IP address pool may be, for example, an IP address that is input by the user in a user-defined manner, or may be automatically generated by the boundary device. In this way, based on the preconfigured fake IP address pool, when receiving a domain name request that carries the malicious domain name and that is sent by the internal DNS server, the boundary device may allocate the fake IP address that is in a one-to-one correspondence with the malicious domain name to the malicious domain name.

In another possible design, after the determining that the host sending the communication link establishment request packet is the compromised host, the method further includes: outputting first attack information, where the first attack information includes identification information of the host and a malicious domain name corresponding to a fake IP address that requests communication with the host. The identification information of the host is an identification information of the compromised host.

According to the possible design, the boundary device may output a security log that includes the first attack information, that is, generate a security log that includes the identification information of the compromised host and the malicious domain name corresponding to the fake IP address that requests communication with the compromised host. In this way, the user may process the host based on the host and malicious domain name recorded in the security log to eliminate security threats of the host. The identification information of the compromised host is, for example, an IP address of the host.

In another possible design, if the fake IP address pool is deployed on a cloud device, the determining a fake IP address that is in a one-to-one correspondence with the malicious domain name includes: sending an address obtaining request for obtaining the fake IP address that is in a one-to-one correspondence with the malicious domain name to the cloud device, where the address obtaining request carries the malicious domain name; and receiving the fake IP address returned by the cloud device based on the address obtaining request, where the fake IP address is a communicable fake IP address that is determined by the cloud device for the malicious domain name and that is in a one-to-one correspondence with the malicious domain name.

In this possible design, an algorithm for allocating the fake IP address to the malicious domain name may be executed by the cloud device, thereby reducing consumption of computing resources of the boundary device.

In another possible design, the IP address in the fake IP address pool is a communicable IP address. If the destination IP address in the communication link establishment request packet is the fake IP address, the method further includes: forwarding the communication link establishment request packet to a network device indicated by the fake IP address, so as to establish a communication connection between the host and the network device; obtaining payload content of a data packet sent by the host to the network device through the communication connection; and outputting second attack information that includes the payload content of the data packet, identification information of the host, and the malicious domain name corresponding to the fake IP address. The identification information of the host that establishes the communication connection to the network device is the identification information of the compromised host.

In this possible design, after determining the compromised host and the malicious domain name of the attack, the boundary device may further obtain payload content (for example, first packet payload content) for communication between the compromised host and an attacker server indicated by the malicious domain name. In other words, according to the embodiment method provided in this application, not only the compromised host can be quickly determined, but also attack evidence information for attacking the compromised host can be obtained. The attack evidence information includes, for example, a domain name of the attacker server, and data payload content of a first scene for communication between the compromised host and the attacker server. In this way, based on the attack evidence information, the user may quickly and effectively analyze an identity of an attacker and an attack property of the attack, so that the user may quickly formulate the effective threat handling solution to process the compromised host, so as to eliminate the threat of the compromised host.

In another possible design, the obtaining payload content of a data packet sent by the host to the network device through the communication connection includes: forwarding the data packet from the host to the network device, where the network device is configured to grab the payload content including the data packet; and receiving the payload content of the data packet sent by the network device.

In this possible design, the payload content of the data packet may be grabbed by the network device indicated by the communicable fake IP address. In this way, consumption of computing resources of the network device may be reduced.

According to a second aspect, embodiments of this application provide an apparatus for determining a compromised host.

In a possible design, the apparatus for determining a compromised host is configured to perform any method provided in the first aspect. According to embodiments, functional module division may be performed on the apparatus for determining a compromised host according to any method provided in the first aspect. For example, each functional module may be divided for each function. In addition, two or more functions may be integrated into one processing module. For example, according to an embodiment, the apparatus for determining a compromised host may be divided into a receiving unit, a determining unit, a sending unit, and the like based on functions. For descriptions of possible technical solutions and beneficial effects performed by the foregoing functional modules obtained through division, refer to the technical solutions provided in the first aspect or corresponding possible designs of the first aspect. Details are not described herein again.

In another possible design, the apparatus for determining a compromised host includes a memory, a network interface, and one or more processors. The one or more processors receive or send data through the network interface, and the one or more processors are configured to read program instructions stored in the memory, to perform the method according to the first aspect and any possible design of the first aspect.

According to a third aspect, embodiments of this application provide a system for determining a compromised host, where the system includes a boundary device and a cloud device, the boundary device is located at a boundary of an internal network of a network system, and the network system further includes a host and an internal domain name system DNS server located in the internal network. The cloud device is located outside the internal network. The boundary device is configured to receive a DNS domain name request from the host, and send, when a domain name in the DNS domain name request is a malicious domain name, an address obtaining request carrying the malicious domain name to the cloud device. The cloud device is configured to receive the address obtaining request, determine a fake IP address that is in a one-to-one correspondence with the malicious domain name carried in the address obtaining request, and return the fake IP address to the boundary device. The boundary device is further configured to receive the fake IP address, and return the fake IP address to the host; and configured to receive a communication link establishment request packet from the host, and determine that the host is the compromised host when a destination IP address in the communication link establishment request packet is the fake IP address.

According to a fourth aspect, embodiments of this application provide a computer-readable storage medium, where the computer-readable storage medium includes program instructions, and when the program instructions are run on a computer or a processor, the computer or the processor is enabled to perform the method provided in any possible implementation of the first aspect.

According to a fifth aspect, embodiments of this application provide a computer program product, and when the computer program product is run on an apparatus for determining a compromised host, any one of method provided in any possible implementation of the first aspect is performed.

According to a sixth aspect, embodiments of this application provide a chip, including a memory and a processor. The memory is configured to store computer instructions, and the processor is configured to invoke the computer instructions from the memory and run the computer instructions, to perform the method according to any one of the first aspect and the possible implementations of the first aspect.

It may be understood that any apparatus, computer storage medium, computer program product, chip system, or the like provided above may be used in a corresponding method provided above. Therefore, for beneficial effects that can be achieved by the apparatus, computer storage medium, computer program product, chip system, or the like, refer to the beneficial effects in the corresponding method. Details are not described herein again.

In this application, a name of the apparatus for determining a compromised host does not constitute a limitation to devices or functional modules. During actual implementation, the devices or the functional modules may exist with other names. The devices or the functional modules fall within the scope of the following claims of this application and their equivalent technologies provided that functions of the devices or the functional modules are similar to functions of devices or functional modules in this application.

DETAILED DESCRIPTION OF THE EMBODIMENTS

Figure 1:
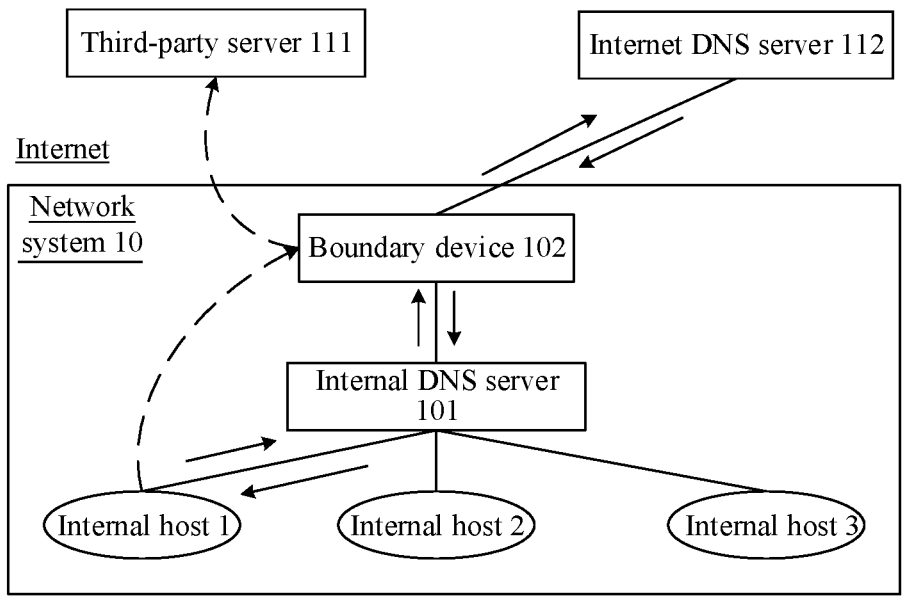
FIG. 1 is a schematic diagram of an architecture of a network system according to an embodiment of this application.

To better understand embodiments of this application, the following describes some terms or technologies involved in embodiments of this application.

(1) Compromised Host

The compromised host is usually a host that is intruded by an attacker through a network and that obtains a control right in a specific manner (for example, by running malicious software through phishing emails). After obtaining the control right, the attacker may use the host as a springboard to continue attacking other hosts in an enterprise intranet.

(2) Other Terms

In embodiments of this application, the terms "first" and "second" do not represent a sequence relationship, but are intended to distinguish between different objects. First, second, and the like mentioned in the following documents are also intended to distinguish between different attack information and the like, and cannot be understood as indicating or implying relative importance or implicitly indicating a quantity of indicated technical features.

It is to be further understood that as used herein, the term "and/or" refers to and includes any and all possible combinations of one or more of the associated listed items. The term "and/or" is an association relationship for describing associated objects and represents that three relationships may exist. For example, A and/or B may represent the following three cases: Only A exists, both A and B exist, and only B exists. In addition, the character "/" in this application generally represents that an "or" relationship between the associated objects.

It is to be further understood that sequence numbers of the processes do not mean execution sequences in embodiments of this application. The execution sequences of the processes should be determined based on functions and internal logic of the processes, and should not be construed as any limitation on the implementation processes of embodiments of this application.

To prevent a boundary device from misjudging an internal DNS server for forwarding a DNS domain name request from a user host as a compromised host, the boundary device may preconfigure information of the internal DNS server, for example, preconfigure an identity document (ID) and an IP address of the internal DNS server. The ID uniquely identifies an internal DNS server.

In this way, when detecting a malicious domain name in the DNS domain name request, the boundary device first determines, based on the preconfigured ID of the internal DNS server and the IP address of the internal DNS server, whether a source IP address in the DNS domain name request is the IP address of the internal DNS server. If yes, the boundary device sends a positioning request to the internal DNS server. The positioning request is for requesting the internal DNS server to position the identity of the compromised host that sends the DNS domain name request carrying the malicious domain name. In response, after receiving the positioning request sent by the boundary device, the internal DNS server determines, based on the DNS domain name request stored in the internal DNS server, the source IP address of the DNS domain name request carrying the malicious domain name. Herein, a host indicated by the source IP address is the compromised host. In this way, a true compromised host is determined.

However, in an actual application, the internal DNS server does not actively initiate interaction with a network boundary device. If the internal DNS server needs to interact with the network boundary device, a service needs to be customized from a service provider. Therefore, the costs of this solution are high. In addition, it is difficult for the network boundary device to obtain information about the internal DNS server.

Based on this, an embodiment of this application provides a method for determining a compromised host. The method is applied to a boundary device. In the method, when detecting a malicious domain name in a received DNS domain name request, the boundary device determines a fake IP address that is in a one-to-one correspondence with the malicious domain name, and returns the fake IP address as a parsed IP address of the DNS domain name request to the host. In this embodiment of this application, the "fake" IP address is a fake IP address relative to a real IP address (that is, an IP address of an attacker server) corresponding to the malicious domain name. In other words, the fake IP address is another IP address different from the IP address of the attacker server, and does not mean that the IP address is definitely fake, does not exist, or is not communicable. It should be understood that the fake IP address may be a communicable IP address, or may be not a communicable IP address. This is not limited herein.

In this way, when receiving a communication link establishment request packet for requesting to communicate with the fake IP address, the boundary device may determine a host that sends the communication link establishment request packet as a compromised host. In addition, the boundary device records identification information of the compromised host and the malicious domain name corresponding to the fake IP address returned by the compromised host in a log and outputs the log. In this way, the malicious domain name is used as attack evidence information for an attacker to attack the compromised host, that is, can be used to perform source tracing on the attacker server that attacks the compromised host. In this way, a solution for processing a threat of the compromised host is quickly formulated subsequently, thereby improving processing efficiency of processing the threat of the compromised host.

Further, in this embodiment of this application, if the fake IP address returned by the compromised host is the communicable fake IP address, when the compromised host uses the communicable fake IP address as the IP address of the attacker server, the boundary device may obtain payload content of a data packet when the compromised host communicates with the communicable fake IP address. The payload content of the data packet is used as the attack evidence information, and can be used to more accurately analyze the threat of the compromised host, so that the user can more accurately and efficiently handle the threat of the compromised host.

An embodiment of this application further provides a network system. The foregoing method for determining a compromised host may be applied to the network system. FIG. 1 is a schematic diagram of an architecture of a network system 10 according to an embodiment of this application. Herein, devices in the network system 10 may perform connection and communication through an internal network. The internal network may be, for example, an enterprise intranet or a school intranet. This is not limited in this embodiment of this application.

As shown in FIG. 1, the network system 10 may include a plurality of internal hosts, an internal DNS server 101, and a boundary device 102. The boundary device 102 is located at a boundary of the internal network of the network system 10. In embodiments of this application, a "boundary" is a broad concept, and a device on a forwarding path of a communication packet between an internal network and an external network may be considered as the boundary device.

The plurality of internal hosts include, for example, an internal host 1, an internal host 2, and an internal host 3. The plurality of internal hosts each are connected to the internal DNS server 101, the internal DNS server 101 is connected to the boundary device 102, and both the plurality of internal hosts and the internal DNS server 101 may access the external network, for example, the Internet, via the boundary device 102. The boundary device 102 may have a function of detecting a malicious domain name, or the boundary device 102 may be connected to and communicate with a safety apparatus having a function of detecting a malicious domain name, which is not limited herein. For example, the boundary device 102 may be a firewall device having a function of detecting a malicious domain name, or a gateway device having a function of detecting a malicious domain name. This is not limited in this embodiment of this application. For another example, the safety apparatus may be, for example, a function server that can provide a function of detecting the malicious domain name.

Based on the network system 10 shown in FIG. 1, the following briefly describes a process in which the internal hosts in the network system 10 requests to communicate with a third-party server 111.

As shown in FIG. 1, when any internal host in the plurality of internal hosts, for example, the internal host 1, needs to communicate with the third-party server 111, a DNS domain name request including a domain name of the third-party server 111 may be first generated, where the DNS domain name request is for obtaining an IP address of the third-party server 111 from the DNS server. Specifically, the internal host 1 may first send the DNS domain name request to the internal DNS server 101.

Then, the internal DNS server 101 may query, based on the DNS domain name request received from the internal host 1, whether a domain name carried in the DNS domain name request exists in a cache record of the internal DNS server 101. If the internal DNS server 101 determines that the domain name carried in the DNS domain name request exists in the cache record of the internal DNS server 101, the internal DNS server 101 returns, based on the cache record of the internal DNS server 101, an IP address (that is, an IP address of the third-party server 111) corresponding to the domain name carried in the DNS domain name request to the internal host 1, so that the internal host 1 accesses the third-party server 111 based on the IP address. If the internal DNS server 101 determines that the domain name carried in the DNS domain name request does not exist in the cache record of the internal DNS server 101, the internal DNS server 101 performs address translation on the DNS domain name request, and sends the DNS domain name request on which the address translation is performed to an Internet DNS server 112 via the boundary device 102 (an Internet DNS server is also referred to as an "external DNS server"). It should be understood herein that address translation means that the internal DNS server 101 replaces a source IP address (that is, an IP address of the internal host 1) in the DNS domain name request received from the internal host 1 with an IP address of the internal DNS server 101.

Then, the Internet DNS server 112 parses the domain name carried in the received DNS domain name request, and returns the IP address (that is, the IP address of the third-party server 111) obtained through parsing to the internal host 1 via the boundary device 102 and the internal DNS server 101 in sequence.

In this way, the internal host 1 may communicate with the third-party server 111 via the boundary device 102 based on the received IP address. For example, the internal host 1 may first establish a communication connection to the third-party server 111 by using a "three-way handshake" packet via the boundary device 102, and communicate with the third-party server 111 based on the communication connection. Herein, a specific process in which the internal host 1 establishes the communication connection to the third-party server 111 by using the "three-way handshake" packet is not described in detail.

An embodiment of this application further provides an apparatus for determining a compromised host. The apparatus may be the boundary device 102 in the network system 10, or a functional module in the boundary device 102, or another device or a functional module in another device that has a communication connection to the boundary device 102. This is not limited in embodiments of this application. For related descriptions of the boundary device 102, refer to the foregoing description. Details are not described herein again.

Figure 2:
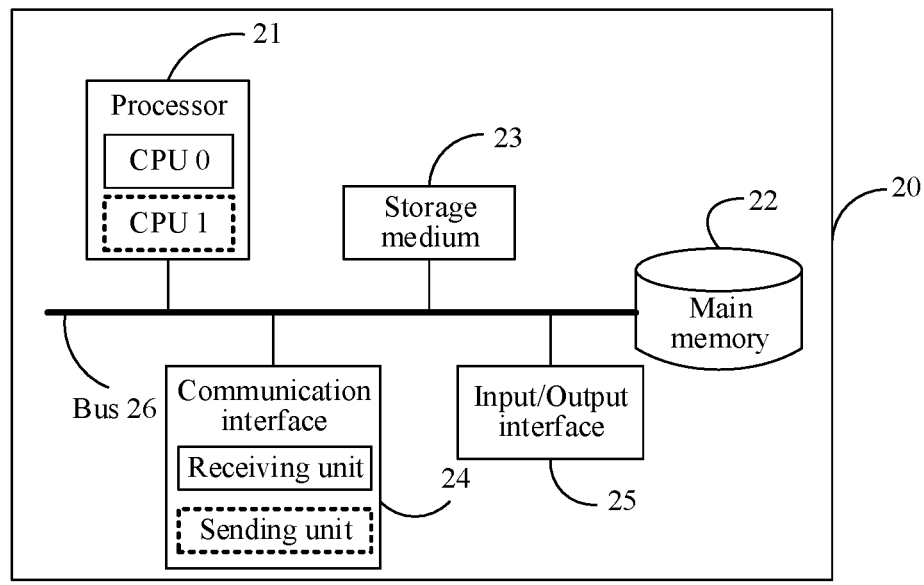
FIG. 2 is a schematic diagram of a hardware structure of a boundary device according to an embodiment of this application.

For example, an apparatus for determining a compromised host is a boundary device. FIG. 2 is a schematic diagram of a hardware structure of a boundary device 20 according to an embodiment of this application. As shown in FIG. 2, the boundary device 20 includes a processor 21, a main memory 22, a storage medium 23, a communication interface 24, an input/output interface 25, and a bus 26. The processor 21, the main memory 22, the storage medium 23, the communication interface 24, and the input/output interface 25 may be connected through the bus 26.

The processor 21 is a control center of the boundary device 20, and may be a central processing unit (CPU). Alternatively, the processor 21 may be another general-purpose processor, a digital signal processor (DSP), an application-specific integrated circuit (ASIC), a field-programmable gate array (FPGA) or another programmable logic device, a discrete gate or a transistor logic device, a discrete hardware component, a graphics processing unit (GPU), a neural processing unit (NPU), a tensor processing unit (TPU), an artificial intelligence chip, or the like. In an example, the processor 21 may include one or more CPUs, for example, a CPU 0 and a CPU 1 shown in FIG. 2. In addition, a quantity of processor cores in each processor is not limited in this application.

The main memory 22 is configured to store program instructions. The processor 21 may execute the program instructions in the main memory 22, to implement the method for determining a compromised host provided in embodiments of this application.

In a possible implementation, the main memory 22 may exist independently of the processor 21. The main memory 22 may be connected to the processor 21 through the bus 26, and is configured to store data, instructions, or program code. When invoking and executing the instructions or the program code stored in the main memory 22, the processor 21 can implement the method for determining a compromised host provided in embodiments of this application.

In another possible implementation, the main memory 22 may also be integrated with the processor 21.

The storage medium 23 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). The storage medium 23 may be configured to store the attack information recorded in embodiments of this application.

The communication interface 24 is configured to connect the boundary device 20 to another device (such as an internal DNS server, an Internet DNS server, or a third-party server) through a communication network. The communication network may be an Ethernet, a radio access network (RAN), a wireless local area network (WLAN), or the like. The communication interface 24 may include a receiving unit configured to receive data/packets and a sending unit configured to send data/packets.

The input/output interface 25 is configured to implement human-computer interaction between the user and the boundary device 20. For example, text interaction or voice interaction between the user and the boundary device 20 is implemented.

The input/output interface 25 may include an input interface configured to enable the user to input information to the boundary device 20, and include an output interface configured to enable the boundary device 20 to output information to the user.

For example, the input interface may include, for example, a touchscreen, a keyboard, a mouse, or a microphone, and the output interface may include, for example, a display screen or a speaker. The touchscreen, the keyboard, or the mouse may be configured to input text/image information, the microphone may be configured to input voice information, the display screen may be configured to output text/image information, and the speaker may be configured to output voice information.

The bus 26 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 2, but this does not mean that there is only one bus or only one type of bus.

It should be noted that the structure shown in FIG. 2 does not constitute a limitation on the boundary device 20. In addition to the components shown in FIG. 2, the boundary device 20 may include more or fewer components than those shown in FIG. 2, or combine some components, or have different component arrangements.

With reference to the accompanying drawings, the following describes in detail a method for determining a compromised host provided in embodiments of this application.

Figure 3:
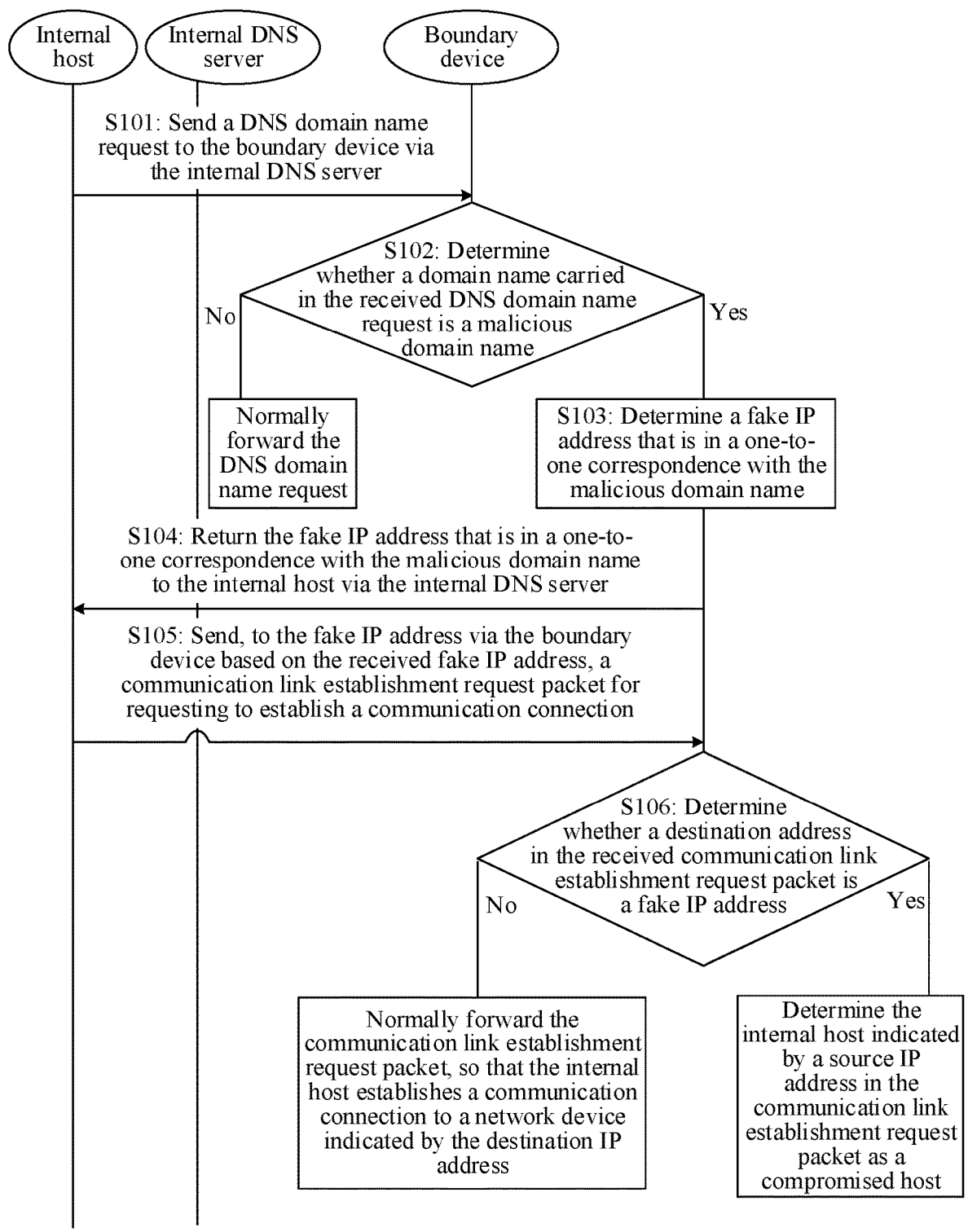
FIG. 3 is a schematic flowchart of a method for determining a compromised host according to an embodiment of this application.

FIG. 3 is a schematic flowchart of a method for determining a compromised host according to an embodiment of this application. Optionally, the method is applied to the network system 10 shown in FIG. 1. The method includes the following step S101 to step S106.

S101: An internal host sends a DNS domain name request to a boundary device via an internal DNS server.

Herein, the internal host (corresponding to the host in embodiments of this application) is any internal host in the network system 10, for example, the internal host 1 in the network system 10.

When the internal host needs to communicate with an external server, the internal host generates a DNS domain name request carrying a domain name of the external server and sends the domain name request to the internal DNS server. When the internal DNS server determines that the domain name carried in the DNS domain name request does not exist in a cache record of the internal DNS server, the internal DNS server performs address translation on the DNS domain name request, and sends the DNS domain name request on which the address translation is performed to the boundary device, so that the boundary device sends the DNS domain name request to the Internet DNS server. Herein, for description of performing address translation by the internal DNS server on a received DNS domain name request, refer to the foregoing description. Details are not described herein again.

For example, if an IP address of the internal host is "100.100.100.100" and an IP address of the internal DNS server is "200.200.200.200", a source IP address of the DNS domain name request sent by the internal host to the internal DNS server is "100.100.100.100". After the internal DNS server performs address translation on the DNS domain name request received from the internal host, the source IP address of the DNS domain name request on which the address translation is performed is the IP address of the internal DNS server "200.200.200.200".

In response, the boundary device may receive the DNS domain name request that is from the internal host and forwarded by the internal DNS server.

S102: The boundary device determines whether the domain name carried in the received DNS domain name request is a malicious domain name.

In a possible implementation, the boundary device determines whether the domain name carried in the received DNS domain name request exists in a malicious domain name database, to determine whether the domain name carried in the DNS domain name request is the malicious domain name.

For example, the domain name carried in the DNS domain name request received by the boundary device is "attack1.com". If the boundary device determines that the domain name "attack1.com" exists in the malicious domain name database, the boundary device determines that the domain name "attack1.com" is the malicious domain name. If the boundary device determines that the domain name "attack1.com" does not exist in the malicious domain name database, the boundary device determines that the domain name "attack1.com" is not the malicious domain name.

Descriptions are provided in different cases below.

Case 1: The malicious domain name database is preconfigured in the boundary device.

In this way, the boundary device directly uses the domain name carried in the DNS domain name request as a keyword to perform retrieval in the preconfigured malicious domain name database, so as to determine whether the domain name carried in the DNS domain name request exists in the malicious domain name database. If the domain name exists, it is determined that the domain name is the malicious domain name; or if the domain name does not exist, it is determined that the domain name is not the malicious domain name.

Case 2: The malicious domain name database is stored in the third-party server located outside the network system 10 shown in FIG. 1.

In this way, after receiving the DNS domain name request that is from the internal host and forwarded by the internal DNS server, the boundary device sends a domain name query request to the third-party server, so as to request the third-party server to determine whether the domain name in the DNS domain name request is the malicious domain name. In response, after receiving the domain name query request sent by the boundary device, the third-party server determines, based on a preconfigured malicious domain name database of the third-party server, whether the domain name carried in the DNS domain name request is the malicious domain name, and returns a determined result to the boundary device. In response, after receiving the result returned by the third-party server, the boundary device determines whether the domain name in the DNS domain name request is the malicious domain name.

In another possible implementation, the boundary device determines, based on a case whether the domain name carried in the received DNS domain name request meets a naming characteristic of the malicious domain name, whether the domain name carried in the DNS domain name request is the malicious domain name.

It may be understood that malicious software usually uses a common domain generation algorithm (DGA) to generate the domain name. Herein, the domain name generated by using the DGA is usually generated by randomly combining a plurality of characters, and most of the character combinations have no semantic meaning. Therefore, the boundary device may determine, based on a corresponding malicious domain name identification algorithm, whether the domain name carried in the received DNS domain name request is the malicious domain name.

For example, for a domain name "1d24dfe.com", if the boundary device determines that the domain name is a random combination of seven characters (including numbers and letters) and does not have any semantics, the boundary device determines that the domain name is the malicious domain name. For a domain name "huawei.com", if the boundary device determines that the domain name is a full spelling of Chinese "Huawei", the boundary device determines that the domain name is not the malicious domain name, that is, the domain name is a normal domain name.

When the boundary device determines that the domain name carried in the received DNS domain name request is the malicious domain name, S103 is performed.

When the boundary device determines that the domain name carried in the received DNS domain name request is not the malicious domain name, the boundary device normally forwards the DNS domain name request. Optionally, the boundary device performs address translation on the received DNS domain name request, and forwards the DNS domain name request on which the address translation is performed to the Internet DNS server, so that the Internet DNS server parses the domain name carried in the DNS domain name request, and returns an IP address obtained through parsing to the internal host through a device such as the boundary device or the internal DNS server, so that the internal host can communicate, based on the received IP address, with a server indicated by the IP address.

That the boundary device performs address translation on the received DNS domain name request specifically means: The boundary device replaces a source IP address (that is, an IP address of the internal DNS server) in the DNS domain name request with an IP address of the boundary device in the Internet.

S103: The boundary device determines a fake IP address that is in a one-to-one correspondence with the malicious domain name.

Optionally, a fake IP address pool is preconfigured on the boundary device, and an IP address in the fake IP address pool is an idle IP address in the internal network of the network system 10. For ease of distinguishing from the following content, the fake IP address pool is referred to as a first fake IP address pool in this embodiment of this application.

In this way, when determining that the domain name in the received DNS domain name request is the malicious domain name, the boundary device may allocate a fake IP address to the malicious domain name based on the preconfigured first fake IP address pool, where the fake IP address is a fake IP address that is in a one-to-one correspondence with the malicious domain name. Alternatively, it may be understood herein that the boundary device establishes a one-to-one correspondence between a malicious domain name in the DNS domain name request and a fake IP address in the first fake IP address pool.

Specifically, the boundary device may allocate any unoccupied fake IP address in the first fake IP address pool to the malicious domain name carried in the DNS domain name request. The any unoccupied fake IP address in the first fake IP address pool is a fake IP address that is not allocated to any malicious domain name in the first fake IP address pool.

For example, the domain name in the DNS domain name request received by the boundary device is a malicious domain name 1, and the boundary device may allocate an unoccupied fake IP address 1 in the preconfigured first fake IP address pool to the malicious domain name 1. In other words, the boundary device establishes a one-to-one correspondence between the malicious domain name 1 and the fake IP address 1.

Further, the boundary device may record the fake IP address and the malicious domain name that have established the correspondence as one piece of log information in a log.

For example, it is assumed that the malicious domain name carried in the DNS domain name request received by the boundary device is "attack1.com", and the fake IP address allocated by the boundary device to the domain name is "10.10.9.1", the boundary device may record the following log: attack1.com: 10.10.9.1.

Optionally, before allocating the fake IP address that is in a one-to-one correspondence with the malicious domain name to the malicious domain name, the boundary device may further first determine whether log information including the malicious domain name and the fake IP address that is in a one-to-one correspondence with the malicious domain name exists in a log of a historical record.

If the boundary device determines that the log information including the malicious domain name and the fake IP address that is in a one-to-one correspondence with the malicious domain name exists in the log of the historical record, the boundary device still determines that the fake IP address recorded in the log information is the fake IP address that is in a one-to-one correspondence with the malicious domain name.

If the boundary device determines that the log information including the malicious domain name and the fake IP address that is in a one-to-one correspondence with the malicious domain name does not exist in the log of the historical record, the boundary device allocates the fake IP address that is in a one-to-one correspondence with the malicious domain name to the malicious domain name in the preconfigured fake IP address pool. The boundary device generates and stores new log information, where the new log information includes the malicious domain name and the allocated fake IP address that is in a one-to-one correspondence with the malicious domain name.

Optionally, the first fake IP address pool may also be preconfigured in a cloud device that has a communication connection to the boundary device.

In this way, when the boundary device determines that the domain name carried in the received DNS domain name request is the malicious domain name, the boundary device sends an address obtaining request used to obtain a fake IP address that is in a one-to-one correspondence with the malicious domain name to the cloud device. The malicious domain name is carried in the address obtaining request. In response, the cloud device may determine, based on the received address obtaining request and the preconfigured first fake IP address pool for the malicious domain name carried in the address obtaining request, a fake IP address that is in a one-to-one correspondence with the malicious domain name, and return the fake IP address to the boundary device. In this way, the boundary device obtains the fake IP address that is determined for the malicious domain name carried in the received DNS domain name request and that is in a one-to-one correspondence with the malicious domain name.

It may be understood that, for a process in which the cloud device determines, for the malicious domain name carried in the received address obtaining request, the fake IP address that is in a one-to-one correspondence with the malicious domain name, refer to the description in which the boundary device determines, for the malicious domain name in the received DNS domain name request, the fake IP address that is in a one-to-one correspondence with the malicious domain name. Details are not described herein again.

It should be further understood that, after determining that the domain name carried in the received DNS domain name request is the malicious domain name, and determining that the log information including the malicious domain name and the fake IP address that is in a one-to-one correspondence with the malicious domain name does not exist in the log of the historical record, the boundary device may also send the address obtaining request used to obtain the fake IP address that is in a one-to-one correspondence with the malicious domain name to the cloud device. In response, the cloud device may determine, based on the preconfigured first fake IP address pool, the fake IP address that is in a one-to-one correspondence with the malicious domain name for the malicious domain name. Details are not described again.

Figure 4A:
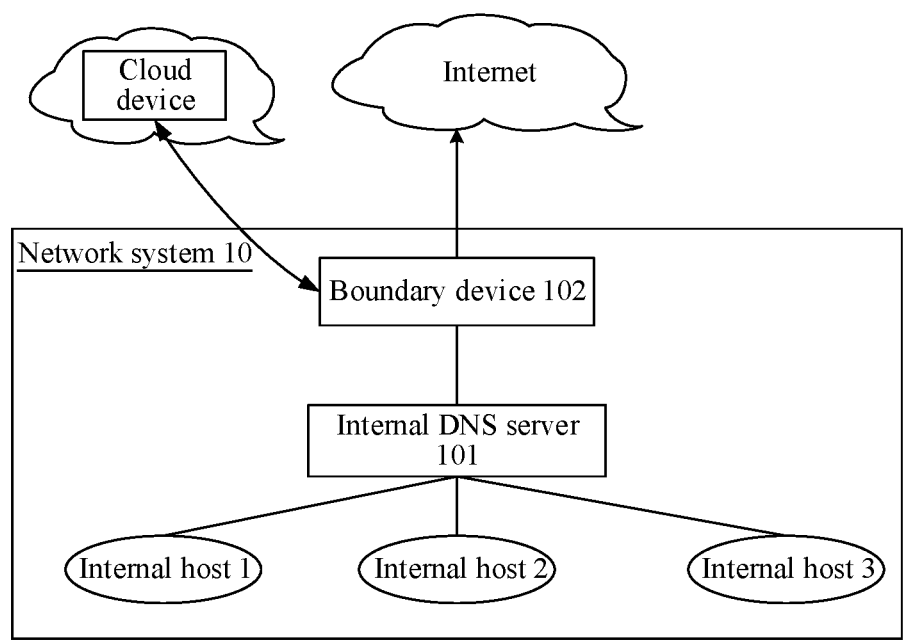
FIG. 4a is a schematic diagram of preconfiguring a first fake IP address pool by a cloud device according to an embodiment of this application.

With reference to the network system 10 shown in FIG. 1, FIG. 4*a* is a schematic diagram of preconfiguring a first fake IP address pool by a cloud device according to an embodiment of this application.

As shown in FIG. 4*a*, after the internal host 1 sends the DNS domain name request to the boundary device 102 via the internal DNS server 101, if the boundary device 102 determines that the domain name in the domain name request is a malicious domain name, and log information including the malicious domain name and a fake IP address that is in a one-to-one correspondence with the malicious domain name does not exist in a locally recorded log, the address obtaining request is sent to the cloud device shown in FIG. 4*a*, so as to obtain a fake IP address that is in a one-to-one correspondence with the malicious domain name. For descriptions of the address obtaining request, refer to the foregoing descriptions. Details are not described herein again.

The following uses an example in which the first fake IP address pool is preconfigured on the boundary device to describe how the boundary device configures the first fake IP address pool.

Optionally, the boundary device may interact with the user through the input/output interface shown in FIG. 2, to configure the first fake IP address pool.

In a possible implementation, the boundary device receives, by using an interaction interface provided by the input/output interface shown in FIG. 2, a network segment address of the first fake IP address pool that is input by the user. Then, the boundary device uses a set of IP addresses included in the network segment address that is input by the user as the first fake IP address pool.

The network segment address that is input by the user to the boundary device is a network segment determined by the user based on an idle IP address in an internal network of the user, and this is not specifically limited.

Figure 4B:
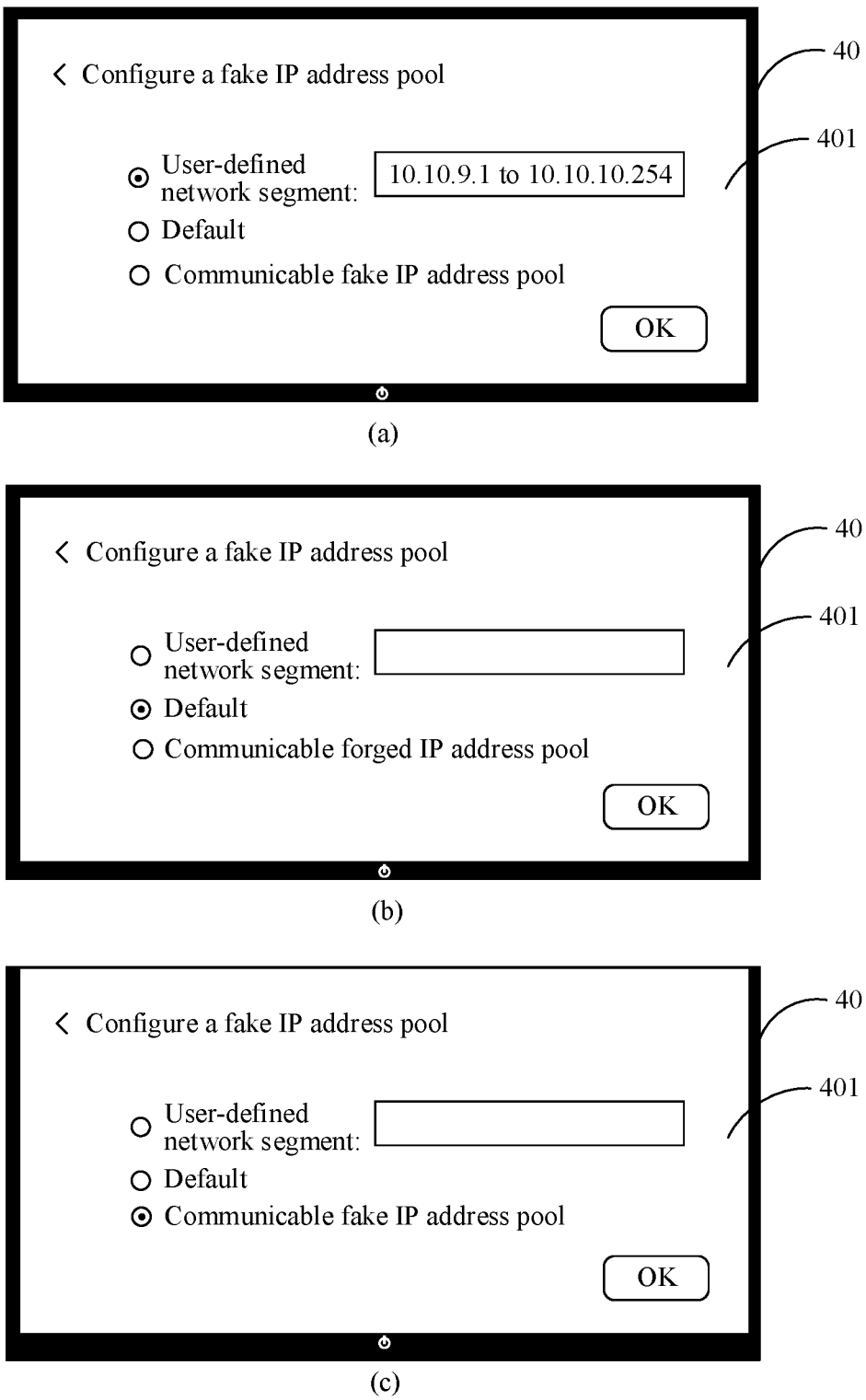
FIG. 4b is a schematic diagram of configuring a fake IP address pool according to an embodiment of this application.
Figure 4C:
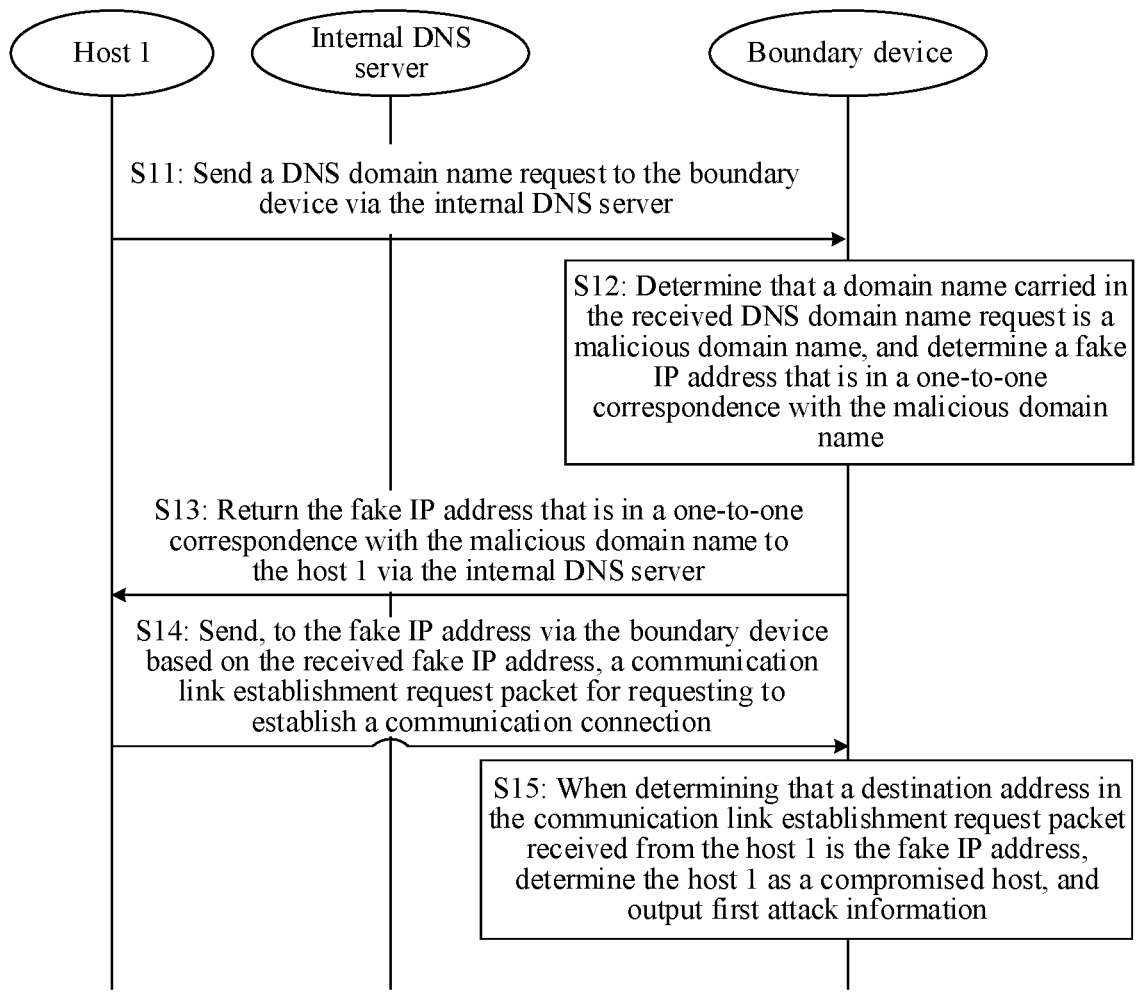
FIG. 4c(a) and FIG. 4c(b) are schematic flowcharts of another method for determining a compromised host according to an embodiment of this application.
Figure 4C:
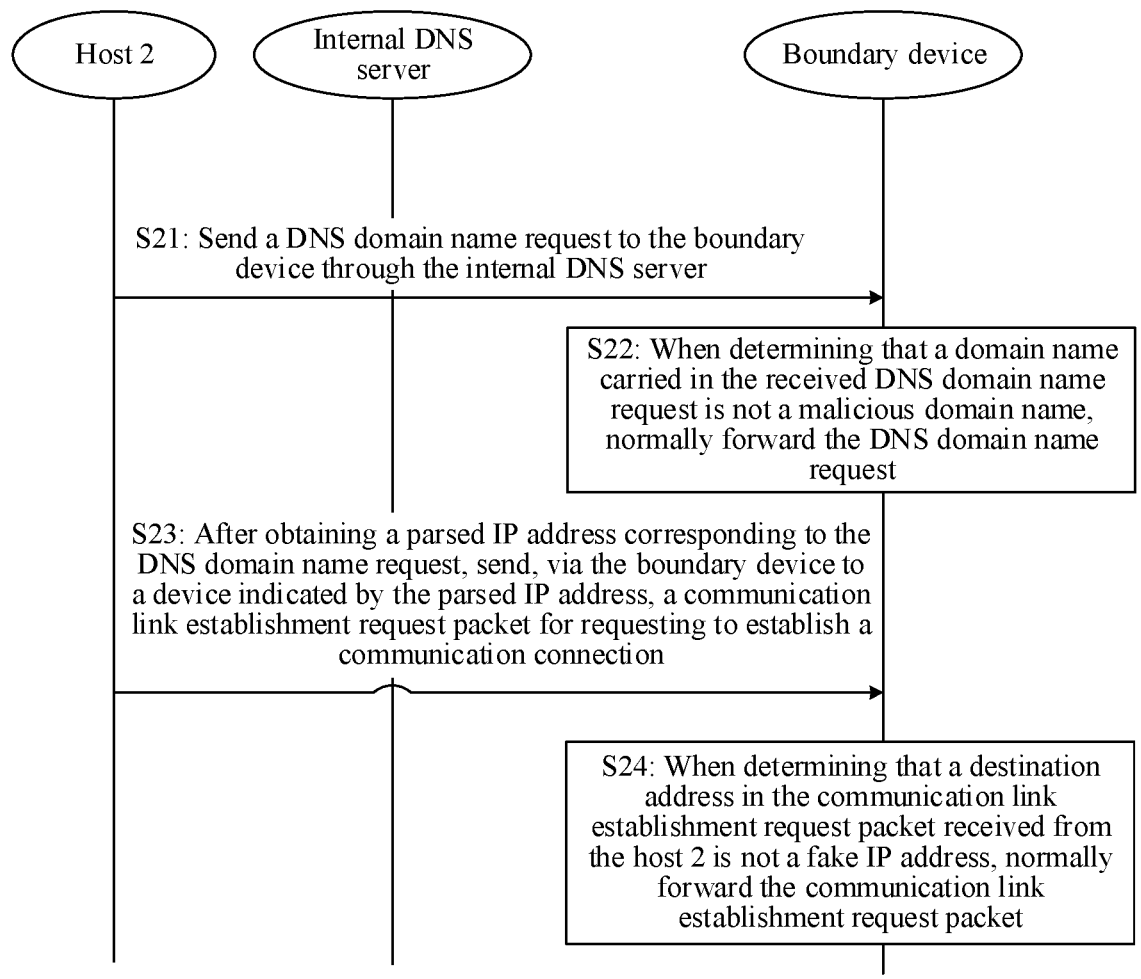

For example, FIG. 4b is a schematic diagram of configuring a fake IP address pool according to an embodiment of this application. As shown in FIG. 4b, the interaction interface 401 for configuring the fake IP address pool is displayed on a display screen 40 of the boundary device.

As shown in (a) in FIG. 4b, on the interaction interface 401, the user may select (for example, select by using a mouse) a "user-defined network segment" option, input (for example, input by using a keyboard) a network segment address, for example, "10.10.9.1 to 10.10.10.254", in an input box of the "user-defined network segment" option, and then click (for example, click by using a mouse) a "confirm" button, to input a network segment address for obtaining the first fake IP address pool to the boundary device. In response, the boundary device receives the network segment address that is input by the user, and uses a set of IP addresses included in the network address as the first fake IP address pool.

In another possible implementation, the boundary device automatically generates the first fake IP address pool based on the idle IP address in the internal network of the network system of the boundary device. Alternatively, the boundary device automatically generates the first fake IP address pool based on an indication that is input by the user and that is for automatically generating the first fake IP address pool, and the idle IP address in the internal network of the network system of the boundary device.

In an example, as shown in (b) in FIG. 4b, on the interaction interface 401, the user may select (for example, select by using a mouse) a "default" option, and click (for example, click by using a mouse) a "confirm" button, to input an indication for automatically generating the first fake IP address pool to the boundary device. In response, the boundary device receives the indication that is input by the user and that is for automatically generating the first fake IP address pool. The boundary device may respond to the indication, that is, automatically generate the first fake IP address pool based on the idle IP address in the internal network of the network system of the boundary device.

S104: The boundary device returns the fake IP address that is in a one-to-one correspondence with the malicious domain name to the internal host via the internal DNS server.

Specifically, the boundary device may use the fake IP address that is determined for the malicious domain name carried in the DNS domain name request from the internal host and that is in a one-to-one correspondence with the malicious domain name as a parsed IP address of the DNS domain name request and return the parsed IP address to the internal host via the internal DNS server. In other words, the boundary device performs address translation on the fake IP address via the internal DNS server, and then sends a translated IP address to the internal host.

In response, the internal host receives the fake IP address returned by the boundary device via the internal DNS server.

It should be understood that, for the DNS domain name request from the internal host, an actual parsed IP address of the malicious domain name carried in the DNS domain name request is an IP address of the attacker server. The IP address returned by the boundary device for the internal host based on the DNS domain name request is the fake IP address that is determined by the boundary device for the malicious domain name carried in the DNS domain name request and that is in a one-to-one correspondence with the malicious domain name.

In an example, it is assumed that a domain name "attack1.com" carried in the DNS domain name request from the internal host is actually parsed to an IP address 202.202.202.202. If the domain name "attack1.com" is a malicious domain name, an actual parsed IP address "202.202.202.202" corresponding to the domain name "attack1.com" is the IP address of the attacker server. The IP address returned by the boundary device to the internal host is a fake IP address (for example, 10.10.9.1) that is determined by the boundary device for the malicious domain name "attack1.com" carried in the DNS domain name request and that is in a one-to-one correspondence with "attack1.com".

S105: The internal host sends, to the fake IP address via the boundary device based on the received fake IP address, a communication link establishment request packet for requesting to establish a communication connection.

After receiving the fake IP address returned by the boundary device, the internal host uses the fake IP address as a parsed IP address of the domain name carried in the DNS domain name request that is initiated by the internal host.

Therefore, the internal host uses the fake IP address as a destination IP address, and generates a communication link establishment request packet for requesting communication with the internal host. Then, the internal host sends the communication link establishment request packet to the fake IP address via the boundary device.

S106: The boundary device determines whether a destination address in the received communication link establishment request packet is a fake IP address.

After receiving the communication link establishment request packet from the internal host, the boundary device determines, based on a pre-recorded log information including the fake IP address and the malicious domain name corresponding to the fake IP address, whether the destination IP address in the received communication link establishment request packet is the fake IP address.

If the boundary device determines that the destination IP address in the received communication link establishment request packet is not the fake IP address, the boundary device normally forwards the communication link establishment request packet, so that the internal host establishes a communication connection to a network device indicated by the destination IP address.

Specifically, the boundary device may perform address translation on the communication link establishment request packet, and forward the communication link establishment request packet on which the address translation is performed to the network device indicated by the destination IP address in the communication link establishment request packet, so that the internal host establishes the communication connection to the network device. That the boundary device performs address translation on the communication link establishment request packet means that the boundary device replaces a source IP address (that is, an IP address of the internal host that sends the packet) in the communication link establishment request packet with an IP address of the boundary device in the Internet.

If the boundary device determines that the destination IP address in the received communication link establishment request packet is the fake IP address, the boundary device determines an internal host (that is, the internal host that sends the communication link establishment request packet) indicated by the source IP address in the communication link establishment request packet as the compromised host.

Further, the boundary device further determines, based on the pre-recorded log information including the fake IP address and the malicious domain name corresponding to the fake IP address (that is, the fake IP address and the malicious domain name that have established the correspondence in S103), a correspondence between the internal host that sends the communication link establishment request packet to the fake IP address (that is, the destination IP address in the communication link establishment request packet) and the malicious domain name that has a correspondence with the fake IP address, and records or outputs first attack information that includes the identification information of the internal host and the malicious domain name. It should be understood that the identification information of the internal host is the identification information of the compromised host determined by the boundary device. Optionally, the identification information of the internal host may be the IP address of the internal host.

Optionally, the first attack information may further include the fake IP address that has a correspondence with the malicious domain name and attack time. The attack time is time at which the internal host sends the communication link establishment request packet to the fake IP address. This is not limited in this embodiment of this application.

For example, the boundary device uses a security log generated based on the received communication link establishment request packet as the first attack information. Specifically, after determining that the destination IP address in the received communication link establishment request packet is the fake IP address, the boundary device may generate and output the security log shown in Table 1.

As shown in Table 1, a "source IP address" is an IP address of the internal host that sends the communication link establishment request packet, for example, "100.100.100.100". A "destination IP address" is the destination address of the communication link establishment request packet. In other words, the boundary device returns a fake IP address, for example, "10.10.9.1", to the internal host based on the malicious domain name in the DNS domain name request received from the internal host. A "corresponding domain name" is a malicious domain name that has a correspondence with the destination address (that is, a fake IP address) of the communication link establishment request packet, that is, the malicious domain name carried in the DNS domain name request initiated by the internal host in S101, for example, "attack1.com". "First access time" is time when the internal host sends the communication link establishment request packet to the fake IP address "10.10.9.1" for the first time, for example, "May 20, 2021". "Latest access time" is time when the internal host sends the communication link establishment request packet to the fake IP address "10.10.9.1" for the last time, for example, "May 21, 2021".

TABLE 1

| Source IP address | Destination IP address | Corresponding domain name | First access time | Latest access time |
| --- | --- | --- | --- | --- |
| 100.100.100.100 | 10.10.9.1 | attack1.com | May 20, 2021 | May 21, 2021 |

In this way, based on the method in S101 to S106 shown in FIG. 3 provided in this embodiment of this application, the boundary device can quickly determine the first attack information including the identification information of the compromised host and the malicious domain name used by the attacker server that attacks the compromised host. In this way, based on a domain name used by the attacker server that attacks the compromised host, the user can determine related information of the domain name from the malicious domain name database, for example, family information of the domain name and information about tactics, techniques, and procedures (TTPs) of the domain name family. In this way, based on the information, the user may quickly analyze and formulate an effective threat handling solution to process the compromised host, so as to eliminate a threat of the compromised host.

To further describe the method shown in FIG. 3 in this embodiment of this application, the following uses a specific example for description.

Example 1: It is assumed that the host 1 is the compromised host. Refer to FIG. 4$c(a)$, a method procedure for the boundary device to determine that the host 1 is the compromised host includes S11 to S15.

S11: The host 1 sends a DNS domain name request to the boundary device via an internal DNS server.

S12: The boundary device determines that a domain name carried in the received DNS domain name request is a malicious domain name, and determines a fake IP address that is in a one-to-one correspondence with the malicious domain name.

S13: The boundary device returns the fake IP address that is in a one-to-one correspondence with the malicious domain name to the host 1 via the internal DNS server.

S14: The host 1 sends, to the fake IP address via the boundary device based on the received fake IP address, a communication link establishment request packet for requesting to establish a communication connection.

S15: When determining that a destination address in the communication link establishment request packet received from the host 1 is the fake IP address, the boundary device determines the host 1 as the compromised host, and outputs first attack information.

Example 2: It is assumed that the host 2 is a normal host, the host 2 and the boundary device perform a method procedure shown in FIG. 4$c(b)$.

S21: The host 2 sends a DNS domain name request to the boundary device via an internal DNS server.

S22: When determining that a domain name carried in the received DNS domain name request is not a malicious domain name, the boundary device normally forwards the DNS domain name request.

S23: After obtaining a parsed IP address corresponding to the DNS domain name request, the host 2 sends, via the boundary device to a device indicated by the parsed IP address, a communication link establishment request packet for requesting to establish a communication connection.

The device indicated by the parsed IP address may be, for example, the third-party server in FIG. 1.

S24: When determining that a destination address in the communication link establishment request packet received from the host 2 is not a fake IP address, the boundary device normally forwards the communication link establishment request packet.

It should be understood that for specific descriptions of S11 to S15 and S21 to S24, refer to related descriptions of S101 to S106 in the method in FIG. 3. Details are not described herein again.

In some other embodiments, to obtain more attack evidence information of the attacker, for example, payload content of a first data packet sent by the compromised host to the attacker server. In embodiments of this application, when the boundary device returns the fake IP address to the internal host, the boundary device may return a communicable fake IP address to the internal host. It should be understood that, the communication connection may be established and communication may be performed between the communicable fake IP address and the internal host through packet exchange. In this manner, after establishing the communication connection between the internal host and the communicable fake IP address, the boundary device may obtain the payload content of the data packet sent by the compromised host to the attacker server when the compromised host uses the communicable fake IP address as the IP address of the attacker server.

Based on the methods in S101 to S106 described above, FIG. 5a is a schematic flowchart of another method for determining a compromised host according to an embodiment of this application. In the method, after the internal host performs S101 and the boundary device performs S102, S103 performed by the boundary device may be replaced with the following S1031.

S1031: The boundary device determines a communicable fake IP address that is in a one-to-one correspondence with the malicious domain name.

The communicable IP address can establish a communication connection to the internal host through packet exchange. For example, the communicable IP address is, for example, an IP address of the boundary device, or an IP address of the cloud device that is connected to and in communication with the boundary device, or an IP address of a lower-level node managed by the cloud device. This is not limited in embodiments of this application.

For ease of distinguishing from the foregoing content, in embodiments of this application, a fake IP address pool including the communicable fake IP address is referred to as a second fake IP address pool. In other words, the second fake IP address pool is for providing the communicable fake IP address.

In a possible case, the second fake IP address pool is preconfigured on the boundary device.

In this case, the boundary device may determine, based on a preconfigured second fake IP address pool, the communicable fake IP address that is in a one-to-one correspondence with the malicious domain name determined in step S102. For a process in which the boundary device determines, based on the second fake IP address pool, the communicable fake IP address that is in a one-to-one correspondence with the malicious domain name determined in step S102, refer to the description in S103 that the boundary device determines, based on the first fake IP address pool, the fake IP address that is in a one-to-one correspondence with the malicious domain name and determined in step S102. Details are not described herein again.

Further, the boundary device records the malicious domain name and the communicable fake IP address that establish the one-to-one correspondence as one piece of log information in a log.

In another possible case, the second fake IP address pool is preconfigured on the cloud device that is connected to and in communication with the boundary device.

In this case, the boundary device determines, through the interaction with the cloud device configured with the second fake IP address pool, the communicable fake IP address that is in a one-to-one correspondence with the malicious domain name determined in step S102. For detailed description, refer to the foregoing description in S103 that when the first fake IP address pool is preconfigured in the cloud device having a communication connection to the boundary device, the boundary device determines, through the interaction with the cloud device, the fake IP address that is in a one-to-one correspondence with the malicious domain name determined in step S102. Details are not described herein again.

It should be understood that, when the boundary device interacts with the cloud device configured with the second fake IP address pool, the address obtaining request sent to the cloud device further carries an ID of the boundary device.

Optionally, when allocating, in a preconfigured second fake IP address pool, the fake IP address that is in a one-to-one correspondence with the determined malicious domain name and is communicable in step S102, the cloud device may further allocate an idle port of the network device indicated by the communicable fake IP address to the malicious domain name. It may be understood that the idle port facilitates the network device indicated by the communicable fake IP address to receive a packet sent by the internal host.

For example, it is assumed that the malicious domain name carried in the address obtaining request that is from the boundary device and that is received by the cloud device is "attack2.com", and an ID of the boundary device is "aoooaaoo". The cloud device may allocate, in the preconfigured second fake IP address pool, an unoccupied communicable fake IP address (for example, an IP address "122.110.109.100" of the cloud device itself) to the malicious domain name "attack2.com", and allocate port information (for example, port information "10008" of the idle port of the cloud device itself) of the idle port of the network device indicated by the IP address. In this way, the cloud device may record log information shown in Table 2.

TABLE 2

| Boundary device ID | Report domain name | Communicable fake IP address and port information |
| --- | --- | --- |
| a000aa000 | attack2.com | 122.110.109.100:10008 |

Further, after determining, through the interaction with the cloud device configured with the second fake IP address pool, that the fake IP address is in a one-to-one correspondence with the determined malicious domain name in step S102, the boundary device may use the malicious domain name and the communicable fake IP address that have the one-to-one correspondence as one piece of log information, and record the one piece of log information.

Optionally, before determining the fake IP address that is in a one-to-one correspondence with the malicious domain name and is communicable in the foregoing two cases, the boundary device may further receive, through the interaction interface provided by the input/output interface shown in FIG. 2, an indication that is input by the user and that is for selecting the second fake IP address pool, and determine, based on the indication and the second fake IP address pool in a process of determining the compromised host, the communicable fake IP address that is in a one-to-one correspondence with the malicious domain name.

In an example, as shown in (c) in FIG. 4b, on the interaction interface 401, the user may select (for example, select by using a mouse) a "communicable fake IP address pool" option, and click (for example, click by using a mouse) a "confirm" button, so as to input an indication of selecting a fake IP address pool (that is, a second fake IP address pool) for providing a communicable fake IP address to the boundary device. In response, the boundary device receives the indication that is input by the user and that is for selecting the second fake IP address pool, and determines, based on the second fake IP address pool, the communicable fake IP address that is in a one-to-one correspondence with the malicious domain name in the process of determining the compromised host.

Then, the boundary device performs S104. In S104, the boundary device returns the communicable fake IP address that is in a one-to-one correspondence with the malicious domain name to the internal host via the internal DNS server.

The internal host performs S105. In S105, the internal host sends, to the communicable fake IP address via the boundary device based on a received communicable fake IP address, a communication link establishment request packet for requesting to establish a communication connection.

The boundary device performs S106. It should be noted that, when the boundary device performs S106, if the boundary device determines, based on the pre-recorded malicious domain name and the log information of the communicable fake IP address that has a one-to-one correspondence with the malicious domain name, that the destination IP address in the communication link establishment request packet received from the internal host is the communicable fake IP address, the boundary device further normally forwards the communication link establishment request packet after determining the internal host (that is, the internal host indicated by the source IP address in the communication link establishment request packet) as the compromised host, so that the internal host establishes a communication connection to the network device indicated by the communicable fake IP address (that is, the destination IP address in the communication link establishment request packet), and after the internal host establishes the communication connection to the network device, S107 is performed.

Optionally, the boundary device performs address translation on the communication link establishment request packet received from the internal host, and forwards the communication link establishment request packet on which the address translation is performed to the network device indicated by the destination IP address in the communication link establishment request packet, so that the internal host establishes the communication connection to the network device. Herein, for description of performing address translation by the boundary device on the communication link establishment request packet, refer to the foregoing description. Details are not described herein again.

It should be understood that, when the cloud device allocates, to the malicious domain name, in addition to the communicable fake IP address (that is, the destination IP address in the communication link establishment request packet), an idle port of the network device indicated by the communicable fake IP address, when performing address translation on the communication link establishment request packet from the internal host, the boundary device not only translates the IP address, but also translates the port in the packet, that is, a port number of the idle port allocated by the cloud device is used to replace a port number of an original destination port in the packet.

Certainly, if the cloud device does not allocate, to the malicious domain name, the idle port of the network device indicated by the communicable fake IP address (that is, the destination IP address in the communication link establishment request packet), the boundary device translates only the IP address when performing address translation on the communication link establishment request packet from the internal host. In this case, when the original destination port in the communication link establishment request packet is not the idle port of the network device indicated by the communicable fake IP, the internal host cannot successfully establish a communication connection to the network device indicated by the communicable fake IP.

Optionally, a communication connection may be established between the internal host and the network device indicated by the destination IP address in the communication link establishment request packet by using the "three-way handshake" packet. The boundary device is configured to forward a "handshake" packet for the internal host and the network device in this process.

Definitely, when determining, based on the pre-recorded malicious domain name and the log information of the communicable fake IP address that is in a one-to-one correspondence with the malicious domain name, that the destination IP address in the communication link establishment request packet received from the internal host is the communicable fake IP address, the boundary device may further determine, based on the correspondence between the communicable fake IP address and the malicious domain name established in S1031, a correspondence between an internal host that sends the communication link establishment request packet to the communicable fake IP address (that is, the destination IP address in the communication link establishment request packet) and a malicious domain name that has a one-to-one correspondence with the communicable fake IP address. Then, the boundary device records and outputs the first attack information that includes the identification information of the internal host and the malicious domain name. It should be understood that, the internal host is the compromised host, and the identification information of the internal host is the identification information of the compromised host. Optionally, the identification information of the internal host may be the IP address of the internal host.

Optionally, the first attack information may further include the fake IP address that has a correspondence with the malicious domain name and attack time. The attack time is time at which the internal host sends the communication link establishment request packet to the fake IP address. This is not limited in embodiments of this application.

For example, the boundary device uses the security log generated based on the received communication link establishment request packet as the first attack information. After determining that the destination IP address in the received communication link establishment request packet is the communicable fake IP address, the boundary device may generate a security log shown in Table 3.

As shown in Table 3, a "source IP address" is an IP address of the internal host that sends the communication link establishment request packet, for example, "100.100.100.100". A "destination IP address" is a destination address of the communication link establishment request packet. In other words, the boundary device returns a communicable fake IP address to the internal host based on the malicious domain name in the DNS domain name request received from the internal host, for example, "122.110.109.100". A "corresponding domain name" is a malicious domain name that has a correspondence with the destination address (that is, a communicable fake IP address) in the communication link establishment request packet, that is, a malicious domain name carried in the DNS domain name request initiated by the internal host in S101, for example, "attack2.com". First access Yes, loime" is time when the internal host sends the communication link establishment request packet to the communicable fake IP address "122.110.109.100" for the first time, for example, "5/20/2021". "Latest access time" is time when the internal host sends the communication link establishment request packet to the communicable fake IP address "122.110.109.100" for the last time, for example, "5/21/2021".

TABLE 3

| Source IP address | Destination IP address | Corresponding domain name | First access time | Latest access time |
| --- | --- | --- | --- | --- |
| 100.100.100.100 | 122.110.109.100 | Attack2.com | May 20, 2021 | May 21, 2021 |

S107: The boundary device obtains payload content of a data packet sent by the internal host to a network device indicated by a communicable fake IP address.

After a communication connection is established between the internal host and the network device indicated by the communicable fake IP address, the internal host may send the data packet to the network device by using the boundary device through the communication connection.

In this way, in a possible implementation, after receiving the data packet sent by the internal host through the communication connection to the network device indicated by the communicable fake IP address, the boundary device forwards the data packet to the network device. In response, the network device receives the data packet, and grabs the payload content of the data packet. Then, the network device sends the payload content of the data packet to the boundary device. In response, the boundary device receives the payload content of the data packet.

Further, the boundary device may add, based on an IP address of the network device sending the data packet, the payload content of a received data packet to the first attack information including the IP address, that is, obtain second attack information.

An example in which an IP address of the network device that establishes a communication connection to the internal host is "122.110.109.100" is used. With reference to Table 3, refer to Table 4, the boundary device may add payload content received from the network device in which IP address is "122.110.109.100" to the first attack information including the IP address "122.110.109.100".

TABLE 4

| Source IP address | Destination IP address | Corresponding domain name | First access time | Latest access time | Details |
| --- | --- | --- | --- | --- | --- |
| 100.100.100.100 | 122.110.109.100 | Attack2.com | May 20, 2021 | May 21, 2021 | Payload content of a data packet |

It can be seen that, in this manner, the network device indicated by the communicable fake IP address grabs the payload content of the data packet sent by the internal host to the network device, thereby avoiding excessive consumption of performance of the boundary device.

In another possible implementation, when receiving the data packet sent by the internal host through the communication connection to the network device indicated by the communicable fake IP address, the boundary device may directly grab the payload content of the data packet. In this way, the boundary device obtains the payload content of the data packet sent by the internal host to the network device indicated by the communicable fake IP address.

Further, the boundary device may add the payload content of a grabbed data packet to the obtained first attack information (the first attack information shown in Table 3) that includes the IP address of the internal host sending the data packet, so as to obtain the second attack information that includes the identification information of the internal host, the malicious domain name, and the payload content.

It can be seen that, when the payload content of the data packet sent by the internal host to the network device indicated by the communicable fake IP address is obtained in this manner, the network device indicated by the communicable fake IP address does not need to be passed through, and therefore, efficiency is higher.

In this way, based on the foregoing method, in embodiments of this application, when the compromised host is quickly determined and the domain name of the attacker server that attacks the compromised host is determined, payload content of data packet of a first scene for communication between the compromised host and the attacker server may be obtained. In this way, based on the payload content of the data packet of the first scene for communication between the compromised host and the attacker server, the user can quickly and effectively analyze the attack property of the attack, so that the user can quickly formulate the effective threat handling solution to process the compromised host, so as to eliminate the threat of the compromised host.

Figure 5A:
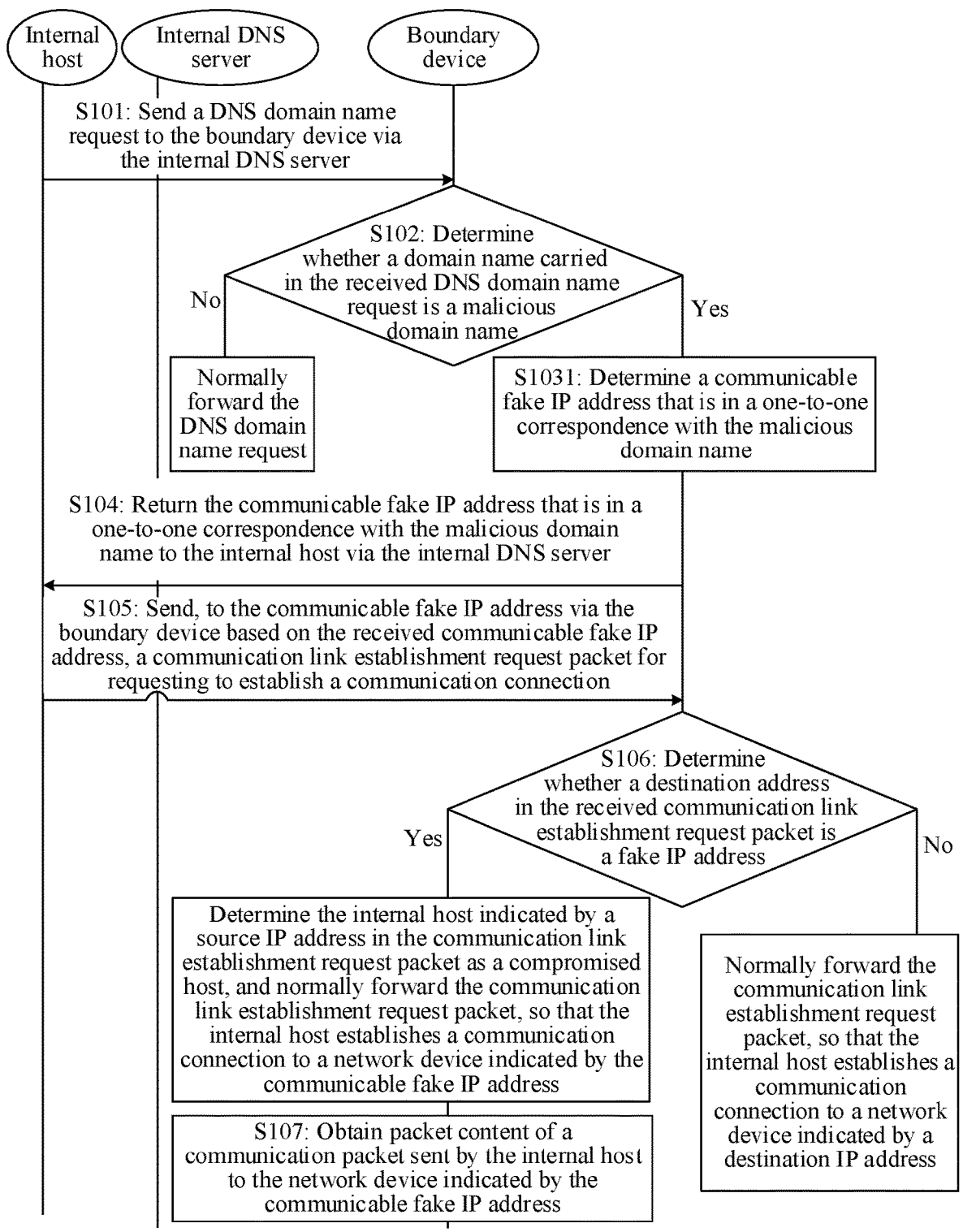
FIG. 5a is a schematic flowchart of another method for determining a compromised host according to an embodiment of this application.

To further describe the method in FIG. 5a in this embodiment of this application, the following uses a specific example for description.

Figure 5B:
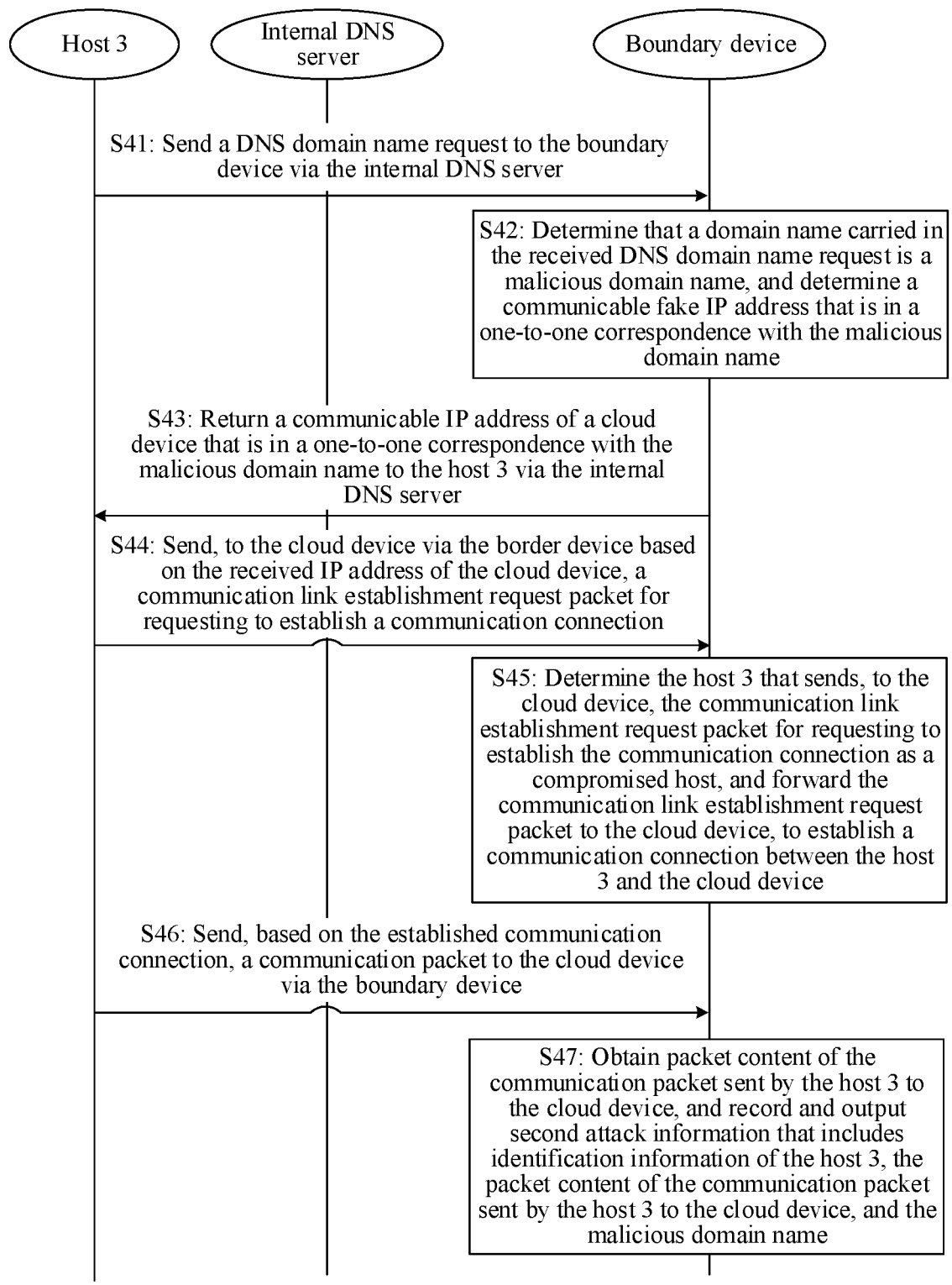
FIG. 5b is a schematic flowchart of another method for determining a compromised host according to an embodiment of this application.

It is assumed that a host 3 is a compromised host. Refer to FIG. 5b, a method procedure for the boundary device to determine that the host 3 is the compromised host includes S41 to S47.

S41: A host 3 sends a DNS domain name request to a boundary device via an internal DNS server.

S42: The boundary device determines that a domain name carried in the received DNS domain name request is a malicious domain name, and determines a communicable fake IP address that is in a one-to-one correspondence with the malicious domain name.

The following uses an example in which the communicable fake IP address that is in a one-to-one correspondence with the malicious domain name is an IP address of a cloud device for description.

S43: The boundary device returns the communicable IP address of the cloud device that is in a one-to-one correspondence with the malicious domain name to the host 3 via the internal DNS server.

S44: The host 3 sends, to the cloud device via the boundary device based on the received IP address of the cloud device, a communication link establishment request packet for requesting to establish a communication connection.

S45: The boundary device determines the host 3 that sends, to the cloud device, the communication link establishment request packet for requesting to establish the communication connection as a compromised host, and forwards the communication link establishment request packet to the cloud device, to establish a communication connection between the host 3 and the cloud device.

S46: The host 3 sends, based on the established communication connection, a data packet to the cloud device via the boundary device.

S47: The boundary device obtains payload content of the data packet sent by the host 3 to the cloud device, and records and outputs second attack information that includes identification information of the host 3, the payload content of the data packet sent by the host 3 to the cloud device, and the malicious domain name.

It should be understood that for detailed descriptions of S41 to S47, refer to the descriptions of S101 to S107 in FIG. 5a. Details are not described herein again.

In conclusion, embodiments of this application provide a method for determining a compromised host. According to the method, not only the compromised host can be quickly determined, but also attack evidence information for attacking the compromised host can be obtained. The attack evidence information includes, for example, a domain name of the attacker server, and data payload content of a first scene for communication between the compromised host and the attacker server. In this way, based on the attack evidence information, the user can quickly and effectively analyze an identity of an attacker and an attack property of the attack, so that the user can quickly formulate the effective threat handling solution to process the compromised host, so as to eliminate the threat of the compromised host.

Figure 6:
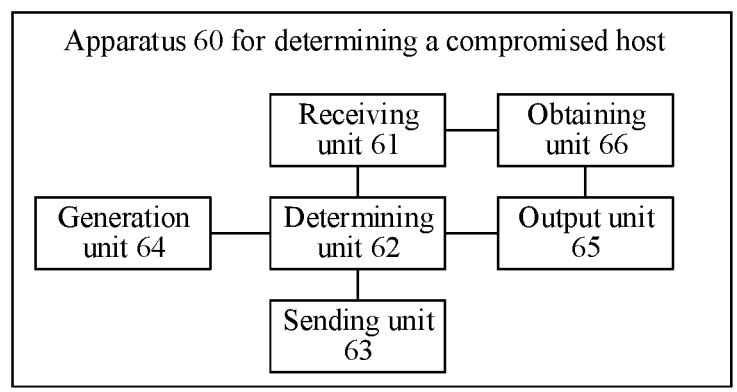
FIG. 6 is a schematic structural diagram of an apparatus for determining a compromised host according to an embodiment of this application.

The foregoing mainly describes the solutions provided in embodiments of this application from a perspective of a method. To implement the foregoing functions, as shown in FIG. 6, FIG. 6 is a schematic structural diagram of an apparatus 60 for determining a compromised host according to an embodiment of this application. The apparatus 60 for determining a compromised host may be applied to the boundary device in the network system shown in FIG. 1, or the boundary device itself in the network system. Herein, the network system further includes the host shown in FIG. 1 and an internal domain name system DNS server. The apparatus 60 for determining a compromised host may be configured to perform the foregoing method for determining a compromised host, for example, configured to perform the methods shown in FIG. 3 and FIG. 5a. The apparatus 60 for determining a compromised host may include a receiving unit 61, a determining unit 62, and a sending unit 63.

The receiving unit 61 is configured to receive, from the host, a DNS domain name request forwarded by the internal DNS server. The determining unit 62 is configured to determine, if a domain name carried in the DNS domain name request is a malicious domain name, a fake internet protocol IP address that is in a one-to-one correspondence with the malicious domain name. The sending unit 63 is configured to return the fake IP address to the host via the internal DNS server. The receiving unit 61 is further configured to receive a communication link establishment request packet from the host. The determining unit 62 is further configured to determine, if a destination IP address in the communication link establishment request packet is the fake IP address, that the host sending the packet is a compromised host.

For example, with reference to FIG. 3 and FIG. 5a, the receiving unit 61 may be configured to perform S101 and S105, the determining unit 62 may be configured to perform S102, S103 (S1031), and S106, and the sending unit 63 may be configured to perform S104.

Optionally, the foregoing fake IP address is any unoccupied IP address in a fake IP address pool.

Optionally, the receiving unit 61 is further configured to receive, before the determining unit 62 determines the fake IP address that is in a one-to-one correspondence with the malicious domain name, a network segment address that is input by a user. The apparatus 60 for determining a compromised host further includes a generation unit 64, configured to generate the foregoing fake IP address pool based on an IP address included in the network segment address; or generate the foregoing fake IP address pool based on an idle IP address in the internal network of the network system.

Optionally, the apparatus 60 for determining a compromised host further includes an output unit 65, configured to output first attack information after the determining unit 62 determines that the host sending the communication link establishment request packet is the compromised host, where the first attack information includes identification information of the host and a malicious domain name corresponding to the fake IP address that requests communication with the host.

Optionally, if the foregoing fake IP address pool is deployed on the cloud device, the sending unit 63 is further configured to send an address obtaining request for obtaining the fake IP address that is in a one-to-one correspondence with the malicious domain name to the cloud device, where the address obtaining request carries the malicious domain name. The receiving unit 61 is further configured to receive the fake IP address returned by the cloud device based on the address obtaining request, where the fake IP address is a communicable fake IP address that is in a one-to-one correspondence with the malicious domain name and that is determined by the cloud device.

Optionally, the IP address in the fake IP address pool is a communicable IP address. If the destination IP address in the communication link establishment request packet is the fake IP address, the sending unit 63 is further configured to forward the communication link establishment request packet to a network device indicated by the fake IP address, so as to establish a communication connection between the host and the network device. The apparatus 60 for determining a compromised host further includes an obtaining unit 66, configured to obtain payload content of a data packet sent by the host to the network device through the communication connection. The output unit 65 is further configured to output second attack information that includes the payload content of the data packet, identification information of the host, and the malicious domain name corresponding to the fake IP address.

For example, with reference to FIG. 5a, the obtaining unit 66 may be configured to perform S107.

Optionally, the sending unit 63 is further configured to forward the data packet from the host to the network device, where the network device is configured to grab the payload content including the data packet. The obtaining unit 66 is specifically configured to receive the payload content of the data packet sent by the network device.

For specific descriptions of the foregoing optional manner, refer to the foregoing method embodiments, and details are not described herein again. In addition, for explanations and descriptions of beneficial effects of any apparatus 60 for determining a compromised host provided above, refer to the foregoing corresponding method embodiments. Details are not described again.

For example, with reference to FIG. 2, functions implemented by the determining unit 62 and the generation unit 64 in the apparatus 60 for determining a compromised host may be implemented by the processor 21 in FIG. 2 by executing program code in the main memory 22 in FIG. 2. Functions implemented by the receiving unit 61 and the sending unit 63 may be implemented through the communication interface 24 in FIG. 2. Functions implemented by the obtaining unit 66 may be implemented by the processor 21 in FIG. 2 by executing program code in the main memory 22 in FIG. 2, or may be implemented through the communication interface 24 in FIG. 2. Functions implemented by the output unit 65 may be implemented through the input/output interface 25 in FIG. 2.

A person skilled in the art should be easily aware that, in combination with the units and algorithm steps of the examples described in the embodiments disclosed in this specification, this application can be implemented by hardware or a combination of hardware and computer software. Whether a function is executed through hardware or hardware driven by computer software depends on particular applications and design constraint conditions of the technical solutions. A person skilled in the art may use different methods to implement the described functions for each particular application, but it should not be considered that the implementation goes beyond the scope of this application.

It should be noted that, module division in FIG. 6 is an example, and is merely logical function division. During actual implementation, there may be another division manner. For example, two or more functions may be integrated into one processing module. The foregoing integrated module may be implemented in a form of hardware, or may be implemented in a form of a software functional module.

An embodiment of this application further provides a system for determining a compromised host. The system includes a boundary device and a cloud device. The boundary device is configured to receive a DNS domain name request from a host, and send, when a domain name in the DNS domain name request is a malicious domain name, an address obtaining request carrying the malicious domain name to the cloud device. The cloud device is configured to receive the address obtaining request, determine a fake IP address that is in a one-to-one correspondence with the malicious domain name carried in the address obtaining request, and return the fake IP address to the boundary device. The boundary device is further configured to receive the fake IP address returned by the cloud device, and return the fake IP address to the host that sends the DNS domain name request; and configured to receive a communication link establishment request packet from the host, and determine that the host is the compromised host when a destination IP address in the communication link establishment request packet is the fake IP address.

An embodiment of this application further provides a computer program product and a computer-readable storage medium configured to store the computer program product. The computer program product may include one or more program instructions. When the one or more program instructions are run by one or more processors, the foregoing functions or some functions described in FIG. 3 or FIG. 5a may be provided. Therefore, for example, one or more features of S101 to S106 in FIG. 3 may be implemented by one or more instructions in the computer program product.

In some examples, the apparatus 60 for determining a compromised host described in FIG. 3 or FIG. 5a may be configured to provide various operations, functions, or actions in response to one or more program instructions stored in the computer-readable storage medium.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When computer-executable instructions are executed on the computer, the procedures or functions based on embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method applied to a boundary device in a network system, wherein the boundary device is located at a boundary of an internal network of the network system, the network system further comprises a host and an internal domain name system (DNS) server located in the internal network, and the method comprises:
   receiving, from the host, a DNS domain name request forwarded by the internal DNS server;
   in response to a domain name carried in the DNS domain name request being a malicious domain name, determining a fake internet protocol (IP) address that is in a one-to-one correspondence with the malicious domain name;
   returning the fake IP address to the host via the internal DNS server;
   receiving a communication link establishment request packet from the host; and
   in response to a destination IP address in the communication link establishment request packet being the fake IP address, determining that the host is a compromised host.

2. The method according to claim 1, wherein the fake IP address is an unoccupied IP address in a fake IP address pool.

3. The method according to claim 2, further comprising, before determining the fake IP address that is in the one-to-one correspondence with the malicious domain name:
   receiving a network segment address that is input by a user, and generating the fake IP address pool based on an IP address comprised in the network segment address; or
   generating the fake IP address pool based on an idle IP address in the internal network of the network system.

4. The method according to claim 1, further comprising, after determining that the host is the compromised host:
   outputting first attack information, wherein the first attack information comprises identification information of the host and the malicious domain name corresponding to the fake IP address.

5. The method according to claim 2, wherein the fake IP address pool is deployed on a cloud device, and determining the fake IP address that is in the one-to-one correspondence with the malicious domain name comprises:
   sending an address obtaining request to the cloud device, wherein the address obtaining request is for obtaining the fake IP address that is in the one-to-one correspondence with the malicious domain name, and the address obtaining request carries the malicious domain name; and
   receiving the fake IP address returned by the cloud device based on the address obtaining request, wherein the fake IP address is a communicable fake IP address that is in the one-to-one correspondence with the malicious domain name and that is determined by the cloud device.

6. The method according to claim 5, wherein an IP address in the fake IP address pool is a communicable IP address, and the method further comprises, in response to the destination IP address in the communication link establishment request packet being the fake IP address:
   forwarding the communication link establishment request packet to a network device indicated by the fake IP address to establish a communication connection between the host and the network device;
   obtaining payload content of a data packet sent by the host to the network device through the communication connection; and
   outputting second attack information, wherein the second attack information comprises the payload content of the data packet, identification information of the host, and the malicious domain name corresponding to the fake IP address.

7. The method according to claim 6, wherein obtaining the payload content of the data packet sent by the host to the network device through the communication connection comprises:
   forwarding the data packet from the host to the network device, wherein the network device is configured to obtain the payload content of the data packet by parsing the data packet; and
   receiving the payload content of the data packet sent by the network device.

8. The method according to claim 2, wherein an IP address in the fake IP address pool is a communicable IP address, and the method further comprises, in response to the destination IP address in the communication link establishment request packet being the fake IP address:
   forwarding the communication link establishment request packet to a network device indicated by the fake IP address to establish a communication connection between the host and the network device;
   obtaining payload content of a data packet sent by the host to the network device through the communication connection; and outputting second attack information, wherein the second attack information comprises the payload content of the data packet, identification information of the host, and the malicious domain name corresponding to the fake IP address.

9. A boundary device configured to be located at a boundary of an internal network of a network system that comprises a host and an internal domain name system DNS server located in the internal network, the boundary device comprising:
a network interface;
a memory with instructions stored thereon; and
at least one processor configured to be in communication with the network interface and the memory, wherein the instructions, when executed by the at least one processor enable the boundary device to perform the following steps:
receive, from the host, a DNS domain name request forwarded by the internal DNS server;
in response to a domain name carried in the DNS domain name request being a malicious domain name, determine a fake internet protocol IP address that is in a one-to-one correspondence with the malicious domain name;
return the fake IP address to the host via the internal DNS server;
receive a communication link establishment request packet from the host; and
in response to a destination IP address in the communication link establishment request packet being the fake IP address, determine that the host is a compromised host.

10. The boundary device according to claim 9, wherein the instructions, when executed by the at least one processor, further enable the boundary device to:
output first attack information after determining that the host is the compromised host, wherein the first attack information comprises identification information of the host and the malicious domain name corresponding to the fake IP address.

11. The boundary device according to claim 9, wherein the fake IP address is any unoccupied IP address in a fake IP address pool.

12. The boundary device according to claim 11, wherein the instructions, when executed by the at least one processor, further enable the boundary device to:
before determining the fake IP address that is in the one-to-one correspondence with the malicious domain name, receive a network segment address that is input by a user; and
generate the fake IP address pool based on an IP address comprised in the network segment address or generate the fake IP address pool based on an idle IP address in the internal network of the network system.

13. The boundary device according to claim 11, wherein the fake IP address pool is deployed on a cloud device, and the instructions, when executed by the at least one processor, further enable the boundary device to:
send an address obtaining request to the cloud device, wherein the address obtaining request is for obtaining the fake IP address that is in the one-to-one correspondence with the malicious domain name, and the address obtaining request carries the malicious domain name; and
receive the fake IP address returned by the cloud device based on the address obtaining request, wherein the fake IP address is a fake IP address that is in the one-to-one correspondence with the malicious domain name and that is determined by the cloud device.

14. The boundary device according to claim 13, wherein an IP address in the fake IP address pool is a communicable IP address, and the instructions, when executed by the at least one processor, further enable the boundary device to:
in response to the destination IP address in the communication link establishment request packet being the fake IP address, forward the communication link establishment request packet to a network device indicated by the fake IP address to establish a communication connection between the host and the network device;
obtain payload content of a data packet sent by the host to the network device through the communication connection; and
output second attack information, wherein the second attack information comprises the payload content of the data packet, identification information of the host, and the malicious domain name corresponding to the fake IP address.

15. The boundary device according to claim 14, wherein the instructions, when executed by the at least one processor, further enable the boundary device to:
forward the data packet from the host to the network device, wherein the network device is configured to grab payload content from the data packet; and
receive the payload content of the data packet sent by the network device.

16. The boundary device according to claim 11, wherein an IP address in the fake IP address pool is a communicable IP address, and the instructions, when executed by the at least one processor, further enable the boundary device to:
in response to the destination IP address in the communication link establishment request packet being the fake IP address, forward the communication link establishment request packet to a network device indicated by the fake IP address to establish a communication connection between the host and the network device;
obtain payload content of a data packet sent by the host to the network device through the communication connection; and
output second attack information, wherein the second attack information comprises the payload content of the data packet, identification information of the host, and the malicious domain name corresponding to the fake IP address.

17. A non-transitory computer-readable storage medium with program instructions stored thereon, wherein when the program instructions are run on a computer or a processor, the computer or the processor is enabled to perform:
receive, from a host in a network system, a DNS domain name request forwarded by an internal DNS server, wherein the network system further comprises an internal domain name system DNS server located in an internal network;
in response to a domain name carried in the DNS domain name request being a malicious domain name, determine a fake internet protocol IP address that is in a one-to-one correspondence with the malicious domain name;
return the fake IP address to the host via the internal DNS server;
receive a communication link establishment request packet from the host; and in response to a destination IP address in the communication link establishment request packet being the fake IP address, determine that the host is a compromised host.

18. A system, comprising:
a boundary device and a cloud device, wherein the boundary device is located at a boundary of an internal network of a network system, the network system further comprises a host and an internal domain name system DNS server located in the internal network, and the cloud device is located in an external network;

the boundary device is configured to receive a DNS domain name request from the host, and send an address obtaining request to the cloud device when a domain name in the DNS domain name request is a malicious domain name, wherein the address obtaining request carries the malicious domain name;

the cloud device is configured to receive the address obtaining request, determine a fake IP address that is in a one-to-one correspondence with the malicious domain name carried in the address obtaining request, and return the fake IP address to the boundary device; and the boundary device is further configured to receive the fake IP address, return the fake IP address to the host, receive a communication link establishment request packet from the host, and in response to a destination IP address in the communication link establishment request packet being the fake IP address, determine that the host is a compromised host.

* * * * *

UNITED STATES PATENT AND TRADEMARK OFFICE
CERTIFICATE OF CORRECTION

| | | |
|---|---|---|
| PATENT NO. | : 12,489,786 B2 | Page 1 of 1 |
| APPLICATION NO. | : 18/620086 | |
| DATED | : December 2, 2025 | |
| INVENTOR(S) | : Duo Yang | |

It is certified that error appears in the above-identified patent and that said Letters Patent is hereby corrected as shown below:

In the Specification

In Column 20, Line 43, delete ""aoooaaoo"." and insert -- "a000aa00". --.

In Column 20, Line 58, delete "a000aa000" and insert -- a000aa00 --.

In Column 24, Line 5, delete "First access Yes, loime"" and insert -- "First access time" --.

In the Claims

In Column 32, in Claim 15, Line 27, after "grab" insert -- the --.

Signed and Sealed this
Twenty-seventh Day of January, 2026

John A. Squires
*Director of the United States Patent and Trademark Office*